United States Patent
Sato

(10) Patent No.: US 6,972,096 B1
(45) Date of Patent: Dec. 6, 2005

(54) CHEMICAL-MECHANICAL POLISHING PROCESS

(75) Inventor: Junichi Sato, Tokyo (JP)

(73) Assignee: Sony Corporation, (JP)

( * ) Notice: Subject to any disclaimer, the term of this patent is extended or adjusted under 35 U.S.C. 154(b) by 982 days.

(21) Appl. No.: 09/161,520

(22) Filed: Sep. 29, 1998

Related U.S. Application Data

(62) Division of application No. 08/739,101, filed on Oct. 25, 1996, now Pat. No. 5,906,949.

(30) Foreign Application Priority Data

Nov. 14, 1995 (JP) ............................... P07-321005

(51) Int. Cl.$^7$ ............................ H01L 21/00; B24B 1/00
(52) U.S. Cl. ..................... 216/89; 438/693; 451/36; 51/309; 423/627
(58) Field of Search ...... 51/307, 309, 293; 216/88–89; 438/690–693; 451/36, 283–289; 423/627; 252/79.1

(56) References Cited

U.S. PATENT DOCUMENTS

| | | | |
|---|---|---|---|
| 4,956,313 A | * | 9/1990 | Cote ........................ 437/238 |
| 5,366,542 A | * | 11/1994 | Yamada ...................... 106/3 |
| 5,445,807 A | * | 8/1995 | Pearson .................... 423/625 |
| 5,478,436 A | * | 12/1995 | Winebarger ................. 216/38 |
| 5,527,423 A | * | 6/1996 | Neville ........................ 106/3 |
| 5,693,239 A | * | 12/1997 | Wang et al. ................. 216/88 |
| 5,723,019 A | * | 3/1998 | Krussell et al. ............... 134/6 |

OTHER PUBLICATIONS

CRC Handbook of Chemistry + Physics 54$^{th}$ Ed CRC Press, 1974.*

Wefers et al. "Oxides and Hydroxides of Aluminum" Alcoa Technical Paper No. 19, Revised, Alcoa Laboratories, 1987.*

* cited by examiner

Primary Examiner—Richard Bueker
(74) Attorney, Agent, or Firm—Rader, Fishman & Grauer PLLC; Ronald P. Kananen

(57) ABSTRACT

A chemical-mechanical polishing process for planarizing at least one or more of thin films formed on a substrate, wherein the chemical-mechanical polishing is performed using a slurry containing abrasive particles mainly made of sialon or boehmite. This process is advantageous in improvement of a polishing rate without degradation in planarity of the processed surface and in level of metal impurities.

7 Claims, 3 Drawing Sheets

CHEMICAL-MECHANICAL POLISHING PROCESS

This application is a divisional of application Ser. No. 08/739,101 filed Oct. 25, 1996 now U.S. Pat. No. 5,906,949.

BACKGROUND OF THE INVENTION

The present invention relates to a chemical-mechanical polishing process, and particularly to a chemical-mechanical polishing process for planarizing at least one or more of thin films formed on a substrate (wafer). The present invention is suitable for forming multilayers of interconnections in a process of fabricating semiconductor devices, particularly, for planarizing interlayer dielectric films or forming metal plugs at high reliability. More specifically, the present invention is suitable for forming multilayers of interconnection used for memory elements or logic operation elements having highly fine and highly integrated structures.

The interconnection technology is increasingly toward finer geometries and multilayers of interconnections along with high density mounting for devices. The technology for forming multilayers of interconnections comes to play a larger role in a process of fabricating semiconductor integrated circuits. On the other hand, the multilayers of interconnections bring about a new disadvantage.

More specifically, steps of interlayer dielectric films become larger and steeper along with a tendency toward fine geometries and multilayers of interconnections, to thereby cause degradation both in processing accuracy and in reliability of an interconnection formed on the interlayer dielectric films having such steps.

At the present time, it is difficult to improve step coverage of an Al interconnection, and accordingly, the planarity of interlayer dielectric films must be improved for ensuring the processing accuracy and reliability of the above interconnection.

The improvement in planarity of interlayer dielectric films also becomes important because it compensates for a reduction in focal depth with the shortened wavelength of light in lithography. In other words, the improved planarity of interlayer dielectric films makes it possible to keep the resolution already reaching the critical value.

Various technologies for forming dielectric films and planarizing them have been developed. However, when applied to multilayers of interconnections having finer geometries, they present vital disadvantages in terms of shortage of planarity in the case of wide gaps between interconnections and in terms of connection failure between interconnections due to spaces generated in interlayer films in gaps between interconnections.

To improve such disadvantages, a chemical-mechanical polishing process (CMP) for global planarization of interlayer dielectric films has been recently carried out or examined. This process has been originally used for mirror-like polishing for a silicon substrate.

The chemical-mechanical polishing process is expected to positively planarize the entire surface of an interlayer dielectric film. In this process, a polishing cloth is placed on a polishing plate and the polishing plate is rotated while slurry is supplied on the polishing cloth. At the same time, a substrate disposed on a carrier is rotated and pressed on the polishing cloth, to thus polish a dielectric film formed on the surface of the substrate. At this time, KOH or the like is added to the slurry for etching the dielectric film in a basic atmosphere.

In the practical use, cleaning is performed after chemical-mechanical polishing for sufficiently removing the residual slurry and the like, thus completing the planarization.

This process, however, has a disadvantage in processing speed, that is, polishing rate. Specifically, the polishing is as low as about 100 nm/min. This is inconvenient for the future chemical-mechanical process in terms of the increased cost due to poor productivity.

In recent years, one approach using a cerium base slurry, that is, a slurry containing particles of cerium oxide has been proposed. This is expected to obtain a polishing rate being 3 to 4 times that in the case of using a related art silica base slurry. The cerium base slurry, on the other hand, presents a problem in poor planarity of the processed surface and in poor level of metal impurities, and therefore, it actually fails to exhibit the expected result.

OBJECT AND SUMMARY OF THE INVENTION

An object of the present invention is to provide a chemical-mechanical process capable of improving a polishing rate without degradation in planarity of the processed surface and in level of metal impurities.

To achieve the above object, the present invention provides a chemical-mechanical process for planarizing at least one or more of thin films formed on a substrate, wherein the chemical-mechanical polishing is performed using a slurry containing abrasive particles mainly made of sialon.

The present invention also provides a chemical-mechanical process for planarizing at least one or more of thin films formed on a substrate, wherein the chemical-mechanical polishing is performed using a slurry containing abrasive particles mainly made of boehmite.

In the related art process, silica base abrasive particles are used. On the other hand, a thin film formed on a substrate is generally made of $SiO_2$. Accordingly, the polishing of the thin film made of $SiO_2$ using the silica base slurry means that $SiO_2$ is polished using $SiO_2$, that is, a material is polished using the same material. As a result, it is difficult to increase the polishing rate when using a silica base slurry of $SiO_2$ by the physical action.

In the present invention, chemical-mechanical polishing is performed using a slurry containing abrasive particles mainly made of sialon or boehmite. Sialon or boehmite is higher in hardness than $SiO_2$. Accordingly, the chemical-mechanical polishing process using the slurry containing abrasive particles mainly made of such a material accelerates the polishing not only by the chemical action but also by the physical action.

As a result, the chemical-mechanical polishing process of the present invention using the slurry containing abrasive particles mainly made of sialon or boehmite increases a polishing rate more than that obtained in the related art chemical-mechanical process. Furthermore, in reactive ion etching, ion bombardment action in addition to chemical action of radicals can increase the etching rate.

DETAILED DESCRIPTION OF THE PREFERRED EMBODIMENTS

Figure 3:
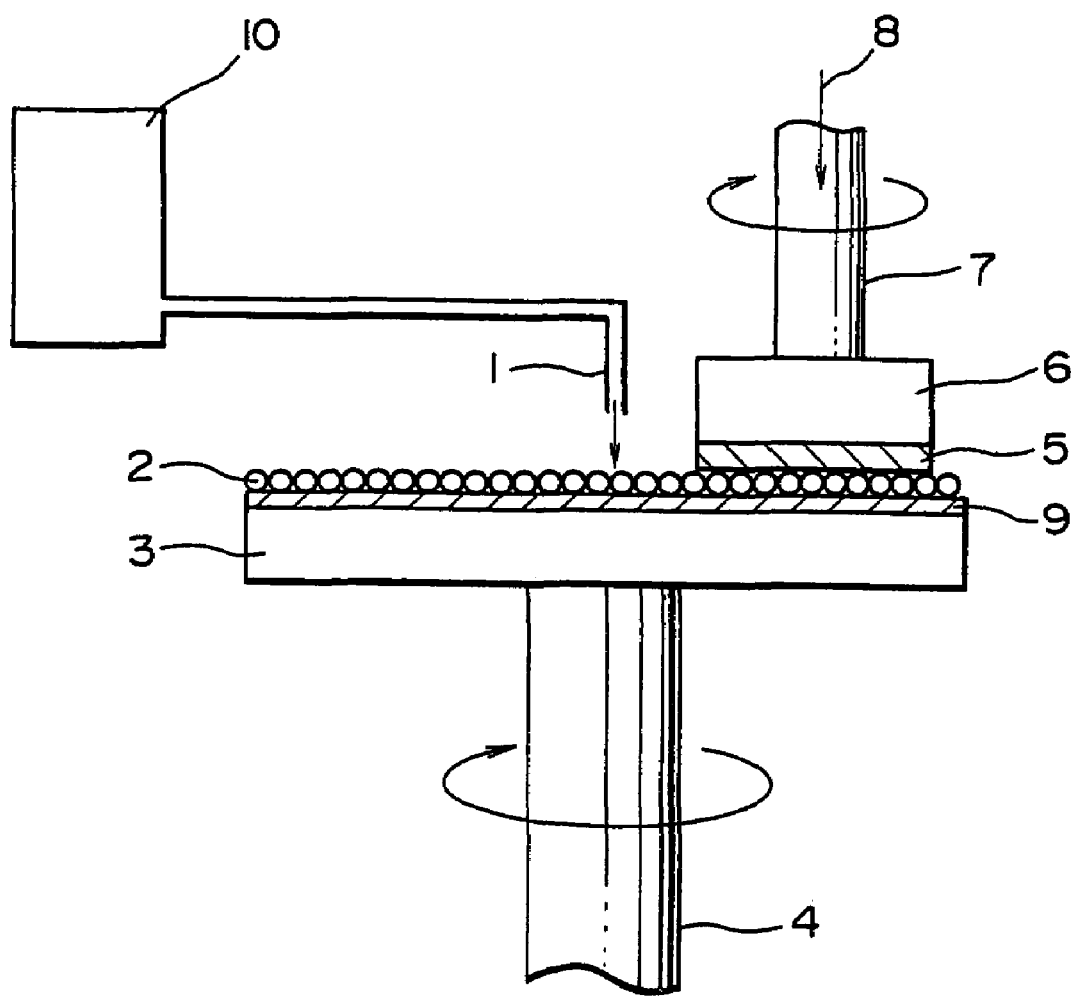
FIG. 3 is a schematic front view of a chemical-mechanical polishing apparatus used for carrying out the present invention.

Hereinafter, the present invention will be described in detail with reference to the accompanying drawings. FIG. 3 is a schematic view of a chemical-mechanical polishing apparatus for carrying out the present invention. A polishing plate 3 called a platen is rotated around a shaft 4. A polishing cloth 9 called a pad is attached on the polishing plate 3, and a slurry feed unit 10 is disposed over the polishing cloth 9. A slurry 2, which is stored in the slurry feed unit 10, is fed on the polishing cloth 9 through a slurry feed port 1.

On the other hand, a carrier 6 mounting a substrate 5 is rotated around a shaft 7. The substrate 5 is rotated together with the carrier 6 and is pressed on the polishing plate 3. The rotational speeds of the polishing plate 3 and the carrier 6, the pressure of a polishing pressure adjuster 8, and the feed amount of the slurry 2 are suitably adjusted. In addition, the above description is for illustrative purposes only, and it is to be understood that the attachment of the substrate, the number and the configuration of each of the platen and the carrier, and the structure of the pad may be changed.

Examples of the present invention will be described below.

EXAMPLE 1

Figure 1A:
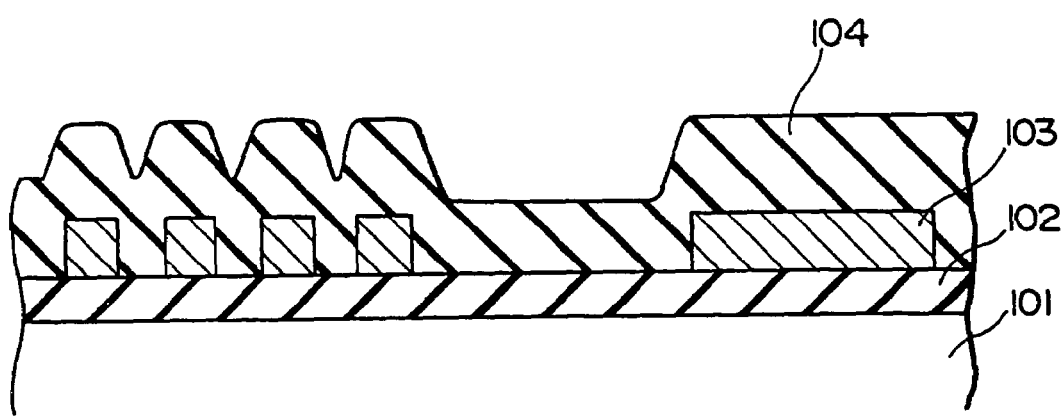
FIG. 1A is a sectional view of an element used in Examples 1, 3 of the present invention, in which interlayer dielectric films and an interconnection are formed on a substrate.

In this example, an interlayer dielectric film formed on an Al interconnection layer is subjected to chemical-mechanical polishing using abrasive particles mainly made of sialon. As shown in FIG. 1A, a first interlayer dielectric film 102 made of silicon oxide and an Al interconnection layer 103 were formed on a semiconductor substrate 101 made of silicon, and a second interlayer dielectric film 104 was formed thereon. In addition, these were all formed by known processes.

The second interlayer film 104 was then subjected to chemical-mechanical polishing under the following condition using a polishing apparatus shown in FIG. 3.

| | |
|---|---|
| rotational speed of polishing plate | 50 rpm |
| rotational speed of carrier | 17 rpm |
| polishing pressure | 8 psi |
| temperature of polishing pad | 30–40° C. |
| flow rate of slurry | 225 ml/min |

The above polishing condition is that generally used for dielectric films. Here, for the purpose of polishing in a basic atmosphere, a suspension in which a slurry containing abrasive particles mainly made of sialon was suspended in a solution of KOH/water/alcohol, was used as a polishing agent. The abrasive particles of sialon was formed from a gas system containing $SiH_4$, $N_2$, $O_2$, $Al(CH_3)_3$ by plasma CVD in such a condition that fine particles could be formed through nuclei growth in a uniform vapor-phase.

Figure 1B:
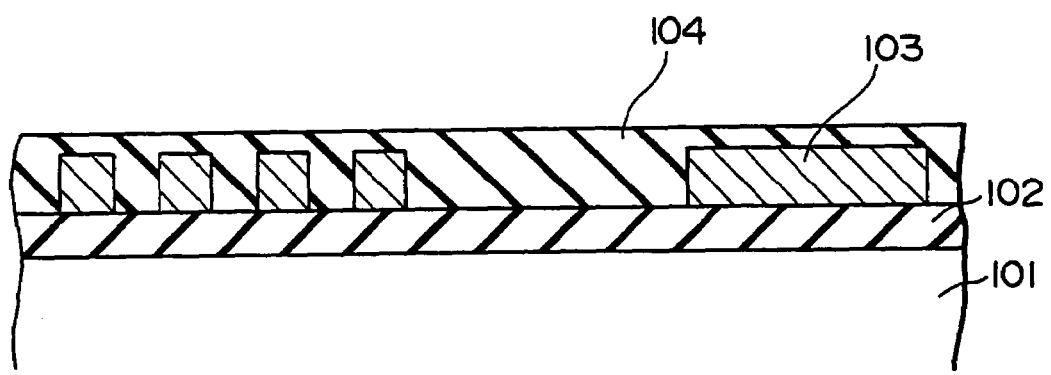
FIG. 1B is a schematic sectional view of the element shown in FIG. 1A, showing the state after the interlayer dielectric film is subjected to chemical-mechanical polishing of the present invention using a slurry containing abrasive particles mainly made of sialon or boehmite.

As a result, the second interlayer dielectric film 104 was planarized, as shown in FIG. 1B. Next, the residual slurry and contamination on the surface of the substrate were removed by a spin cleaner using chemicals of $NH_4OH$—$H_2O_2$—$H_2O$ and dilute hydrofluoric acid in this order, and finally, the surface of the substrate was rinsed with pure water. The residual slurry and contamination were thus removed in a satisfactory level. In particular, although contamination due to aluminum as a component of sialon was a matter of concern, it was sufficiently removed by the above cleaning.

In this example, the chemical-mechanical polishing rate become twice that obtained in the case of using the related art silica base slurry. The shape of the planarized film was also excellent.

EXAMPLE 2

Figure 2A:
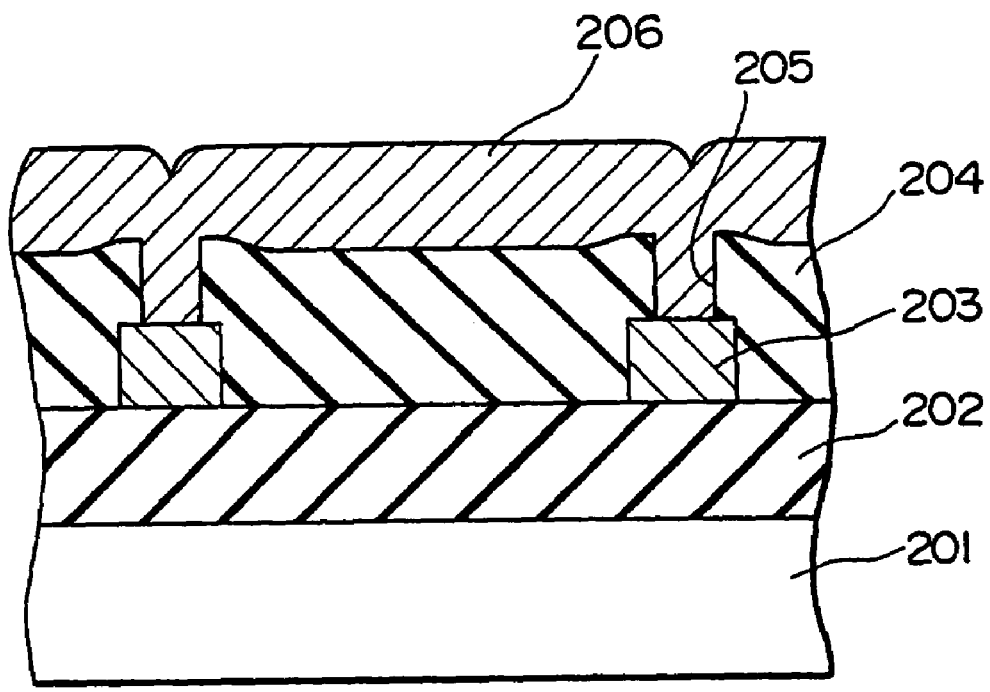
FIG. 2A is a schematic view of an element used in Example 2 of the present invention, in which interlayer dielectric films, an interconnection, and blanket tungsten are formed on a substrate.

In this example, a metal film formed on an interlayer dielectric film so as to bury openings connected to an Al interconnection layer is subjected to chemical-mechanical polishing using the abrasive particles mainly made of sialon. As shown in FIG. 2A, a first interlayer dielectric film 202 made of silicon oxide and an Al interconnection layer 203 were formed on a semiconductor substrate 201 made of silicon; a second interlayer dielectric film 204 was formed thereon; and openings 205 were formed in the second interlayer film 204 and buried with a blanket tungsten 206. These were all formed by known processes.

The blanket tungsten 206 was subjected to chemical-mechanical polishing under the following condition using the polishing apparatus shown in FIG. 3.

| | |
|---|---|
| rotational speed of polishing plate | 50 rpm |
| rotational speed of carrier | 17 rpm |
| polishing pressure | 10 psi |
| temperature of polishing pad | 30–40° C. |
| flow rate of slurry | 225 ml/min |

The polishing condition is that generally used for films. Here, for the purpose of polishing in an acidic atmosphere, a suspension in which a slurry containing abrasive particles mainly made of sialon was suspended in a solution of dilute hydrofluoric acid/water/alcohol, was used as a polishing agent. The abrasive particles of sialon was formed in the same manner as that in Example 1.

Figure 2B:
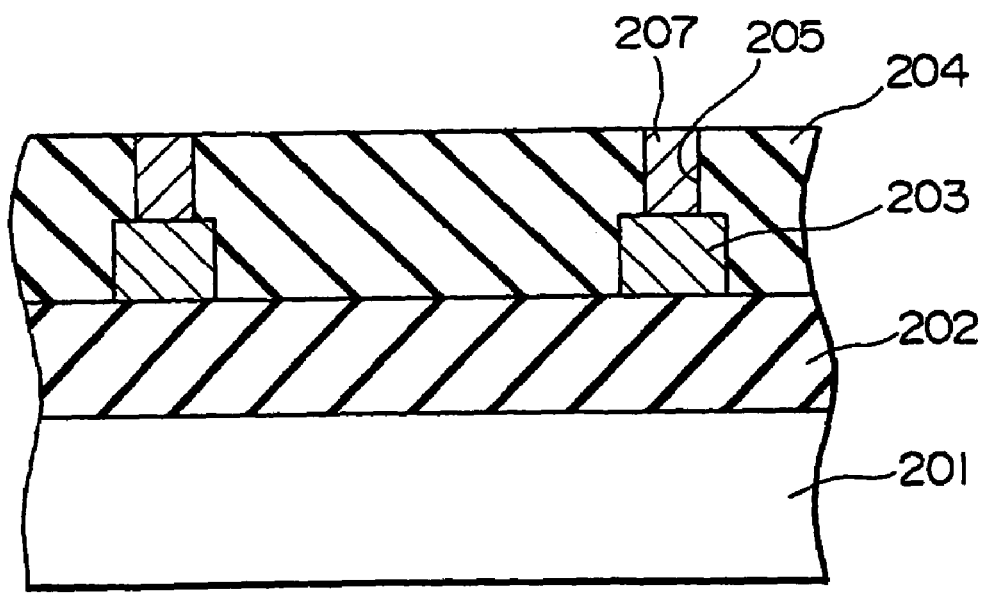
FIG. 2B is a schematic sectional view of the element shown in FIG. 2A, showing the state after the blanket tungsten is subjected to chemical-mechanical polishing using a slurry containing abrasive particles mainly made of sialon.

As a result, the blanket tungsten 206 was planarized, as shown in FIG. 2B. Next, the residual slurry and contamination on the surface of the substrate were removed by the spin cleaner using chemicals of $NH_4OH$—$H_2O_2$—$H_2O$ and dilute hydrofluoric acid in this order, and finally, the surface of the substrate was rinsed with pure water. The residual slurry and contamination were thus removed in a satisfactory level.

In this example, the chemical-mechanical polishing rate become 2.5 times that obtained in the case of using the related art silica base slurry. The planarized shape of the plug 207 was also excellent.

EXAMPLE 3

In this example, an interlayer dielectric film formed on an Al interconnection layer is subjected to chemical-mechanical polishing using abrasive particles mainly made of boehmite (AlOOH). The shape of a substrate is the same as that used in Example 1 (FIG. 1).

Specifically, as shown in FIG. 1A, a first interlayer dielectric film 102 made of silicon oxide and an Al interconnection layer 103 were formed on a semiconductor substrate 101 made of silicon, and a second interlayer dielectric film 104 was formed thereon. In addition, these were all formed by known processes.

The second interlayer film 104 was then subjected to chemical-mechanical polishing under the following condition using the polishing apparatus shown in FIG. 3.

| | |
|---|---|
| rotational speed of polishing plate | 50 rpm |
| rotational speed of carrier | 17 rpm |
| polishing pressure | 8 psi |
| temperature of polishing pad | 30–40° C. |
| flow rate of slurry | 225 ml/min |

The above polishing condition is that generally used for dielectric films. Here, for the purpose of polishing in a basic atmosphere, a suspension in which a slurry containing abrasive particles mainly made of boehmite was suspended in a solution of KOH/water/alcohol, was used as a polishing agent. The abrasive particles of boehmite were formed by dipping of particles of Al in a hot water at 80° C. In addition, it is effective to add sodium aluminate to the hot water, as needed.

As a result, the second interlayer dielectric film 104 was planarized, as shown in FIG. 1B. Next, the residual slurry and contamination on the surface of the substrate were removed by the spin cleaner using chemicals of $NH_4OH$—$H_2O_2$—$H_2O$ and dilute hydrofluoric acid in this order, and finally, the surface of the substrate was rinsed with pure water.

The residual slurry and contamination were thus removed at a satisfactory level. In particular, although contamination due to aluminum as a component of boehmite was a matter of concern, it was sufficiently removed by the above cleaning.

In this example, the chemical-mechanical polishing rate became 1.5 times that obtained in the case of using the related art silica base slurry. The shape of the planarized film was also excellent.

As described above, according to the present invention, at least one or more of the thin films formed on a substrate were subjected to chemical-mechanical polishing using a slurry containing abrasive particles mainly made of sialon or boehmite.

The present invention thus makes it possible to realize a polishing rate higher than that obtained in the related art using the silica base slurry, and hence to fabricate VLSIs or the like at high reliability and high productivity.

The present invention also makes it possible to sufficiently compensate for a reduction in focal depth with the shortened wavelength of light in lithography because of improvement in planarity of interlayer dielectric films, and hence to keep the resolution already reaching a critical value.

In addition, it is to be understood that the present invention is not limited to the above-described specific examples, and the configuration, condition and the like may be suitably changed without departing the scope of the present invention. For example, the planarization for the tungsten plug can be performed using the boehmite base slurry.

What is claimed is:

1. A chemical-mechanical polishing process, for planarizing one or more thin films formed on a substrate, wherein the chemical-mechanical polishing is performed using an abrasive particles basic slurry in which all of said abrasive particles consist of boehmite, wherein the particles of boehmite are formed by dipping particles of Al in hot water, and wherein sodium aluminate is added to said hot water.

2. A chemical-mechanical polishing process for planarizing one or more films formed on a substrate, wherein said thin films are subjected to chemical-mechanical polishing using an abrasive particles slurry in which all of said abrasive particles consist essentially of boehmite, wherein residual slurry and contamination are removed by spin cleaning, wherein the abrasive particles of boehmite are formed by dipping particles of Al in hot water, and wherein sodium aluminate is added to said hot water.

3. A polishing process which comprises the steps of:
   forming abrasive boehmite particles by dipping particles of aluminum in heated water with sodium aluminate added thereto;
   creating a slurry containing said abrasive boehmite particles; and
   planarizing at least one film formed on a substrate by employing a chemical-mechanical polishing process using said slurry.

4. The polishing process according to claim 3, wherein said heated water is about 80° C.

5. The polishing process according to claim 3, wherein said slurry used in said chemical-mechanical polishing process is a basic slurry.

6. The polishing process according to claim 5, wherein said step of creating a slurry comprises suspending said boehmite particles in a solution containing KOH, water, and an alcohol.

7. The polishing process according to claim 3, wherein said film is an interlayer dielectric film.

* * * * *